United States Patent
Kulmala et al.

(10) Patent No.: US 11,233,769 B2
(45) Date of Patent: Jan. 25, 2022

(54) RULE-BASED INFORMATION EXCHANGE IN INTERNET OF THINGS

(71) Applicant: ABB Schweiz AG, Baden (CH)

(72) Inventors: Jari Kulmala, Espoo (FI); Jyrki Tapani Peltoniemi, Espoo (FI); Mika Luotojarvi, Espoo (FI); Tuan Vu, Helsinki (FI); Riku Hyttinen, Kerava (FI); Simo Saynevirta, Espoo (FI)

(73) Assignee: ABB Schweiz AG, Baden (CH)

( * ) Notice: Subject to any disclaimer, the term of this patent is extended or adjusted under 35 U.S.C. 154(b) by 139 days.

(21) Appl. No.: 16/571,863

(22) Filed: Sep. 16, 2019

(65) Prior Publication Data
US 2020/0014660 A1 Jan. 9, 2020

Related U.S. Application Data

(63) Continuation of application No. PCT/EP2018/056606, filed on Mar. 15, 2018.

(30) Foreign Application Priority Data

Mar. 15, 2017 (EP) ..................... 17161013

(51) Int. Cl.
*H04L 29/06* (2006.01)
(52) U.S. Cl.
CPC ........ *H04L 63/0227* (2013.01); *H04L 63/029* (2013.01)
(58) Field of Classification Search
CPC ........................ H04L 63/0227; H04L 63/029
USPC .......................................................... 726/1
See application file for complete search history.

(56) References Cited

U.S. PATENT DOCUMENTS

| | | | |
|---|---|---|---|
| 2006/0031510 A1* | 2/2006 | Beck | H04L 67/327 709/226 |
| 2008/0235755 A1 | 9/2008 | Blaisdell et al. | |
| 2008/0301760 A1* | 12/2008 | Lim | H04L 63/10 726/1 |
| 2016/0080425 A1 | 3/2016 | Cianfrocca | |

(Continued)

FOREIGN PATENT DOCUMENTS

WO 2016206110 A1 12/2016

OTHER PUBLICATIONS

Timm Morten Steinbeck, arXiv.com, "A Modular and Fault-Tolerant Data Transport Framework", Dissertation submitted to the Joint Faculties for Natural Sciences and Mathematics of the Ruperto Carola University of Heidelberg, Germany, for the degree of Doctor of Natural Sciences (Year: 2004).*

(Continued)

*Primary Examiner* — Khalil Naghdali
(74) *Attorney, Agent, or Firm* — Greenberg Traurig, LLP

(57) ABSTRACT

For data flow traffic in an IoTSP system, for example, a gateway is provided with data flow rules, one or more of the data flow rules being a receiving rule defining at least what incoming data will be accepted and one or more of the data flow rules being a publishing rule defining at least what data to send to one or more other computing devices acting as gateways in the system. The one or more receiving rules are applied to incoming data, and the one or more publishing rules to stored and processed data to cause sending one or more pieces of the data in response to a condition in a publishing rule being fulfilled.

20 Claims, 3 Drawing Sheets

(56) References Cited

U.S. PATENT DOCUMENTS

2017/0063782 A1\* 3/2017 Jain ..................... G06F 16/9024
2017/0063797 A1\* 3/2017 Jain ..................... H04L 63/0263

OTHER PUBLICATIONS

European Patent Office, International Search Report & Written Opinion issued in corresponding Application No. PCT/EP2018/056606, dated Jun. 7, 2018, 11 pp.
European Patent Office, Search Report issued in corresponding Application No. 17161013.2, dated Sep. 7, 2017, 3 pages.
Lee et al., "A Smart Gateway Framework for IOT Services," 2016 IEEE International Conference on Internet of Things (iThings) and IEEE Green Computing and Communications (GreenCom) and IEEE Cyber, Physical and Social Computing (CPSCom) and IEEE Smart Data (SmartData), pp. 107-114.

\* cited by examiner

RULE-BASED INFORMATION EXCHANGE IN INTERNET OF THINGS

FIELD

The present invention relates to data flows in Industrial Internet of Things.

BACKGROUND ART

The evolvement of networking between computers and computing devices, especially different sensors, capable to communicate over the Internet without user involvement, has led to a so called Internet of Things intended for domestic appliances, and to Industrial Internet of Things intended for professional/enterprise use. The Industrial Internet of Things is a network concept which connects an industrial Thing and its embedded one or more sensors, for example, with the Internet, for open information exchange and communication, in order to achieve tracking, monitoring and management of the Thing, for example. It has been estimated that the number of Internet-connected devices is likely to multiply to tens of billions. Even with evolving network technology and increasing data rates the amount of data to be transmitted from a device or a node may be too big to be transferred without disturbing data transfers from other devices or nodes.

SUMMARY

An object of the present invention is to control data flows. The object of the invention is achieved by a method, a computer program product, a non-transitory computer readable medium and an apparatus which are characterized by what is stated in the independent claims. The preferred embodiments of the invention are disclosed in the dependent claims.

A general aspect of the invention uses one or more data flow rules for determining which data and when to send and/or receive.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system implementing central management and edge computing to data collected by Industrial Internet of Things, or a corresponding industrial system generating data. Below different embodiments and examples are described assuming that concepts called cloud computing and virtualization are used, without restricting the embodiments/examples to such a solution. The virtualization may allow a single physical computing device to host one or more instances of virtual machines that appear and operate as independent computing devices so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN), may cause one or more of the below described functionalities to be migrated to any corresponding abstraction or apparatus or device. Therefore, all words and expressions should be interpreted broadly and they are intended to illustrate, not to restrict, the embodiment.

Figure 1:
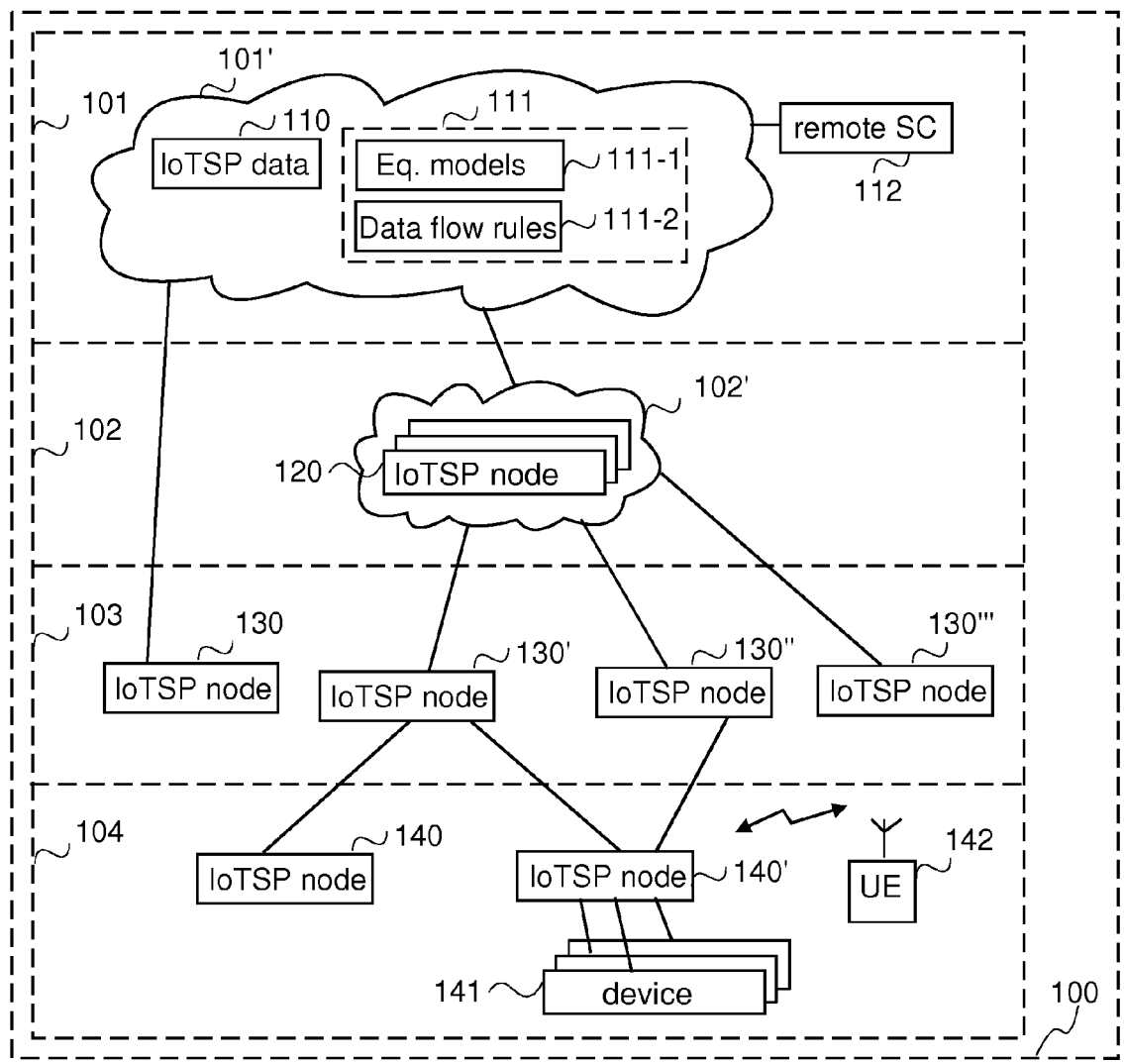
FIG. 1 shows simplified architecture of a system.

A general exemplary architecture of a system is illustrated in FIG. 1. FIG. 1 is a simplified system architecture only showing some devices, apparatuses and functional entities, all being logical units whose implementation and/or number may differ from what is shown. The connections shown in FIG. 1 are logical connections; the actual physical connections may be different. Data collection may use so called master protocols (a master is also known as a protocol client) in which a network node subscribes data from slaves (devices whose data it wants to have) and/or slave protocols (a slave is also known as a protocol server) in which a device/network node sends its data without any specific subscription to the receiver (slave/server). It is apparent to a person skilled in the art that the systems also comprise other nodes (apparatuses, devices), functions and structures used in or for Industrial Internet of Thing, big data, virtualization, data management, and communication in the system or in one part of the system. They, as well as protocols used, are well known by persons skilled in the art and are irrelevant to the actual invention. Therefore, they need not to be discussed in more detail here.

In the examples below, a concept called Internet of Things, Services and People (IoTSP) is used as an example of Industrial Internet of Things, without restricting the examples to such a concept. Further, below an equipment model is used as an example of an information model without restricting the example to the equipment model. It is obvious to one skilled in the art how to implement the disclosed principles when other information models, such as information models relating to production transactions, are used.

In the example illustrated in FIG. 1, the system 100 comprises four different hierarchical levels: a global cloud level 101 forming a level for central management, then one or more enterprise levels 102 (only one depicted in FIG. 1), one or more plant levels 103 (only one depicted in FIG. 1) and one or more device levels 104 (only one depicted in FIG. 1), that depicts a level for different "Things". It should be appreciated that any other level structure and/or hierarchy may be used between the device level 104 and the global cloud level 101.

The global cloud level 101 comprises a global cloud 101' that comprises data 110 (IoTSP data) originating from the Things. The data 110 may comprise raw data and/or analysis data. Further, the global cloud 101' comprises a global equipment model repository 111 (a global information model repository) that comprises a plurality of equipment models 111-1 and rules 111-2 for data flows, called herein data flow rules.

An equipment model describes metadata for interpreting semantics of an equipment. In other words, the equipment model describes properties of an equipment it models, and it's a kind of a virtual equipment type, or type definitions, to provide specific desired functionality. The term "equipment" means herein a virtual representation of a Thing. There may be different equipment models for different hierarchy levels. The equipment model contains for each property in the model definitions such as description, unit, aggregation rules and the data collection protocol with sampling rules. For example, an equipment model may comprise following definitions:

Name of the model
Link to owner of the model and other documentation
Version number of the model
Possible inheritance from another model
Property definitions that may contain for each property: data type of the property (float, integer, text, array of something, etc.), scalar or time series, unit, value range, type of histories to be collected (storage, aggregation rules, such as time averages, standard min/max, operating time, etc.), data acquisition definitions (protocol, item id, collection cycles, etc.), alarming limits. Further, the property definitions may contain rules or definitions how to map local data in a device/node to the model properties. An example of mapping definitions include defining from which variable, register, or memory location the data in the device is read to particular property value and how frequently.
Function definitions that describe which kind of functions the device can perform
Interface definitions for exposing model specific application programming interfaces (APIs)

The model definitions for equipment models 111-1 may be according to ISA-95 type equipment model definitions, for example. ISA-95 is an ISO standard defining, among other things, standard terminology and information models, which can be used to define equipment models. It should be appreciated that any other model definitions for information models may be used as well.

To summon up, one may say that the equipment model defines semantics for the data, controls the device data recording and provides basis for analytics and applications, and basis for visualization, without detailed information on the actual device instances or signal names. The equipment model thereby provides tools for common information modelling. Thanks to that, data from heterogeneous data sources may be combined in a structured manner.

The data flow rules 111-2 may comprise equipment model-specific definitions, instance-specific definitions and a combination of the equipment model definitions and instance-specific definitions. A data flow rule may define what data is to be sent, and possibly also when to send the data. A data flow rule may also define what kind of data will be received and/or how the data is to be converted, if conversion is needed, for example because of different equipment model definitions in use. Different examples how the data transfer may be applied and created will be described in more detail below. The data flow rules may be called also data traffic rules or data communication rules, or any other name covering the same or corresponding rules may be used as well.

Further, as in the illustrated example, one or more remote service centers 112 (remote SC) are connected to the global cloud 101'. A remote service center may be used for defining, or updating definitions of one or more equipment models 111-1 and/or data flow rules 111-2, but it may be used also for other purposes. For example, in a multi-enterprise scenario the remote service center may provide maintenance services to different enterprises as an analysis system or part of the analysis system, and each enterprise using the maintenance services has its own one or more levels below the global level 101.

The enterprise level 102 may comprise one or more enterprise level clouds 102' that in turn may comprise one or more gateways 120 (computing nodes), called herein IoTSP nodes. The gateways 120 in the enterprise level may provide an enterprise wide service platform for applications including equipment models and instances, data collection, enterprise analytics, and other application runtimes, for example.

The plant level 103 comprises a plurality of gateways 130, 130', 130', 130''' (computing nodes) called herein IoTSP nodes. The gateways 130 in the plant level may provide a plant wide service platform for applications including equipment models and instances, data collection, plant analytics, and other application runtimes, for example. The plant level may be implemented by use of one or more clouds, virtual machines, and/or physical computers. As can be seen in FIG. 1, the gateways 130, 130', 130", 130''' in the plant level may be connected directly to the global cloud, and/or via one or more gateways in the enterprise level to the global cloud.

The device level 104 comprises in addition to a plurality of devices 141 one or more gateways 140, 140' (computing nodes) whereto devices 141 are connected. The gateways 140, 140' in the device level may provide a device, a system, or production line wide service platform for applications including equipment models and instances, data collection, analytics, and other application runtimes, for example. Although not illustrated in FIG. 1, the gateways in the device level may be connected directly to the global cloud, or via one or more gateways in the enterprise level, or via one or more gateways in the device level, or as illustrated in FIG. 1, via a chain or chains of gateways in the plant level and enterprise level. It should be appreciated that although illustrated only in the device level gateway, a gateway in any level may send data (transfer data) to a plurality of gateways (two, three, four, etc.) in higher levels. For example, one gateway may send data to gateways that represent different functional purposes, for example one for asset monitoring and production tracking and one for energy management.

The devices 141 represent in FIG. 1 Things that the Industrial Internet of Things, or as in the example, the Industrial Internet of Things, Services and People, comprises. The Things may be different devices, machines, apparatuses, equipment, systems, sub-systems, processes etc. Few examples of Things include a pump, motor, valve, car, fridge, production line and a control loop. There are no restrictions what constitutes a Thing, it suffices that the Thing comprises means for performing one or more different measurements on environment and/or one or more operations, for example, and means for sending the information at least to one or more IoTSP nodes. Further, a Thing may itself comprise Things that the analytics sees as one, combined Thing. The implementation of the Industrial Internet of Things, data collected therefrom and means used for information exchange bears no significance to the invention, and therefore they are not described in more detail here. It is obvious for one skilled in the art that any known or future solution may be used.

Further, in the illustrated example, a user (with proper access rights) at a local site may connect to gateways 140, 140' by means of his/her user equipment 142. It should be appreciated that, although not depicted in FIG. 1, in each level a user (with proper access rights) may connect to a gateway by means of his/her user equipment, or via a corresponding service center, to study, process etc. data on the corresponding level.

As said earlier, the above illustrated hierarchy depicts only one example. For example, at the device level there may be a gateway connected to a plurality of devices and to one or more gateways that in turn are connected to a plurality of devices. Further, gateways on the same level may be connected to each other. The hierarchical structure enables central management of equipment models and data flow rules including their distribution within the IoTSP node in which they are pushed from cloud to downwards in the hierarchy and thereby will be applied by all gateways (computing nodes). However, the equipment models do not have to be the same in each gateway, the data flow rules provide a tool to enable conversions between the equipment models as well as between different data types.

Although not illustrated in FIG. 1, the connections may be over one or more networks, which may be of same type or different type. The type of network and protocols used bear no significance to the invention and therefore are not described in more detail herein.

To summon up, FIG. 1 illustrates an IoTSP platform architecture that provides connectivity and drill-down data access through the levels to required details irrespective of the actual data storage. Further, the IoTSP platform architecture provides means for integrated management and control of essential resources from the device level up to the global cloud. The main information flow directions are from the global cloud level to lower levels (from top to bottom) and from device level to upper levels (from bottom to top). Information propagated from top to bottom may include function calls (actions to be performed by devices), data, and metadata that is controlling the data flows, analytics, and visualization (metadata including changes in the equipment models and data flow rules), retrieval of details and actions to be performed in devices. Information sent from bottom to up includes typically measured signal and aggregated data organized according to the metadata. It should be appreciated that actual system topologies, integrations with external systems, etc. may differ based on industry requirements, and products, for example.

Figure 2:
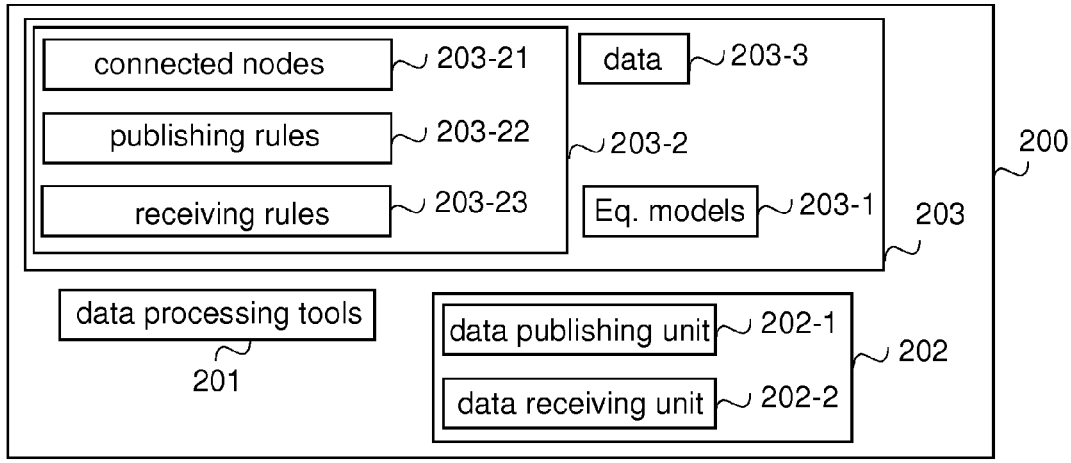
FIG. 2 is a block diagram of an exemplified apparatus.

FIG. 2 is a generalized block diagram of a gateway 200, i.e. an IoTSP node, representing a gateway at any level described above with FIG. 1. The gateway is a computing device (node) configured at least to send and/or receive data, either as a standalone device or embedded in an existing device. Depending on a gateway and its use, the gateway may be a small electrical device, a mobile device, a tablet, a laptop, a personal computer, or a server, just to mention some examples. Naturally, the gateway may include a data storage and/or one or more user interfaces.

In the illustrated example, the gateway comprises one or more data processing tools 201 for different analytics on the data. The data processing tools may include data management and/or analytics. The data management processes incoming data, i.e. performs the defined processing, alarm detection, aggregation, and stores the data to a data storage that may be in the gateway or in a cloud. Analytics contain one or more analytic tools. An analytic tool is a special purpose analysis software (application), or a software suite (application suite). At the simplest, an analytic tool may be an application performing some simple calculations, like calculating averages, or some other data processing according to the settings in an equipment model. The analytic tool may be based on data visualization, data mining, mathematical models of an industrial process used, machine learning, such as deep learning, unsupervised learning, semi-supervised learning, supervised learning, anomaly detection, and self-learning artificial intelligence, etc. However, the actual functionality and the purpose of the data management and/or analytic tools, and how it is defined what performs what, for example performs alarming, are not relevant for the invention and any known or future data management and/or analytic tool may be used.

To control data flows to and/or from the gateway 200, the gateway comprises a data flow unit 202 and in a memory 203 equipment models 203-1, data 203-3, and one or more data flow rules 203-2. In the illustrated example, the data flow unit 202 comprises two sub-units: a data publishing unit 202-1 and a data receiving unit 202-2. Naturally, the sub-units may be implemented as separate units, or combined together to one unit. The data publishing unit 202-1 provides data transfer services (data publishing services) and the data receiving unit 202-2 provides data reception services (data receiving services). Further, although illustrated as separate units, the functionality of the data flow unit, or one of its subunits, may be integrated to be part of a corresponding analytic tool. However, the data flow unit is treated as a separate unit (separate sub-units) herein in order to illustrate the data flow control functionality. The functionality of the data flow unit (or more precisely its sub-units) is described in more detail with FIGS. 3 to 7.

The gateway comprises as equipment models 203-1 either a copy of each equipment model in the cloud level, or at least a copy of each equipment model belonging to a subset of equipment models in the cloud level. The copies are preferably installed and updated centrally and automatically, as well as the data flow rules, from the global cloud level, for example. However, it should be appreciated that local installation and/or updating is also possible.

In the illustrated example, the data flow rules 203-2 comprise information on connected nodes (connected nodes information) 203-21, and actual data flow rules. The actual data flow rules define data that the gateway is to publish (feed/send/transfer), i.e. publishing rules 203-22, and what data the gateway accepts to receive, i.e. receiving rules 203-23. Each rule may be associated with one or more of equipment models, for example with a gateway type. For example, a gateway in the device level may be associated with a publishing rule "transfer all data" and a gateway in the enterprise level may be associated with a publishing rule "transfer daily averages". It should be appreciated that in the top of the hierarchy and/or in the bottom of the hierarchy, or in a specific (exceptional) case, the gateway may comprise only one of the publishing rules 203-22 and the receiving rules 203-23.

The connected nodes information 203-21 in the data flow rules 203-2 comprises information on gateways and possible other devices and nodes whereto the gateway is directly connected to for sending (publishing) and/or for receiving data. Connected nodes (including gateways) may also be called neighbouring devices or neighbours. Although in the illustrated example the connected nodes information 203-21 is interpreted to belong to the data flow rules 203-2, the connected nodes information 203-21 may be treated as a separate information. Naturally, the connected nodes information 203-21 is updated to reflect changes in the environment: if another gateway that is in the connected nodes information 203-21 is disconnected from the gateway 200, the other gateway is removed from the list of the connected nodes 203-21, and vice versa, if a further gateway is connected to the gateway 200, the further gateway is added to the connected nodes information.

The publishing rules 203-22 comprise definitions on data that is to be transferred (sent/published) to neighbours (assuming that the data is available when it is time to send it). The publishing rules may also contain definitions when the data is to be sent and/or whereto (northbound/southbound) the data is to be sent. With the publishing rules 203-22 a principle "collect data once and send it (share, transfer) for one, two, etc., i.e. for a plurality of different functional purposes implemented in gateways in different levels" is realized. For each property in a corresponding equipment model there may be specific definitions defining how the property or its value is published and/or how the value is aggregated before publishing. An example of a data publishing rule is "Transfer data in all equipment instances starting from the equipment root of type X.Y.Z. com with the related property specific definitions that contain data as "daily operating time", "maximum hourly temperature", "sum of daily startups"". Another example is "Transfer all data". There are no limitations for the publishing rules. It should be appreciated that there may be one or more gateways that send everything that it has received. Further, there may be one or more gateways that does not send anything, i.e. the corresponding publishing rule does not exist, or defines that nothing is to be sent.

The receiving rules 203-23 define what data the gateway 200 accepts to receive and/or declines to receive. A receiving rule may be "decline all data except temperature", or "accept only temperature". Another example is "accept all", i.e. receive and process everything. There are no limitations for the receiving rules. A receiving rule may even define that a gateway receives nothing.

Further, since data types and/or equipment model definitions may be different in connected gateways/nodes, the data flow rules may comprise conversion rules in the publishing rules 203-22 and/or in the receiving rules 203-23. The conversion rules in the publishing rules may define how the local data to be published is converted to be according to the receiving gateway's/node's local data or a common data format used in communications, for example. The conversion rules in the receiving rules may define how the received data is converted into the gateway's local data format. An advantage provided by the conversion rules is that each node may use its local data format to locally store and process the data. A further advantage of converting the received data is that since one cannot change the sending entity, the data is nevertheless after conversion in a proper data format of the receiving entity.

Further, equipment models may include definitions affecting to the receiving rules and/or to the publishing rules.

In other words, the data flow rules 203-2 cause the data flow unit 202, or more precisely the data publishing unit 202-1, to send (feed/publish) data to one or more connected gateways/nodes (northbound and/or southbound) according the gateway's 200 own publishing rules 203-22, possibly convert the data before sending, and to receive from one or more connected gateways/nodes (southbound and/or northbound) data that is according to respective gateway's publishing rules and that will be received or accepted according to the receiving rules 203-23 of the gateway 200, and possibly converted. In other words, a gateway sends data according to its publishing rules and accepts data sent to the gateway if the data passes filtering defined by one or more receiving rules.

Figure 3:
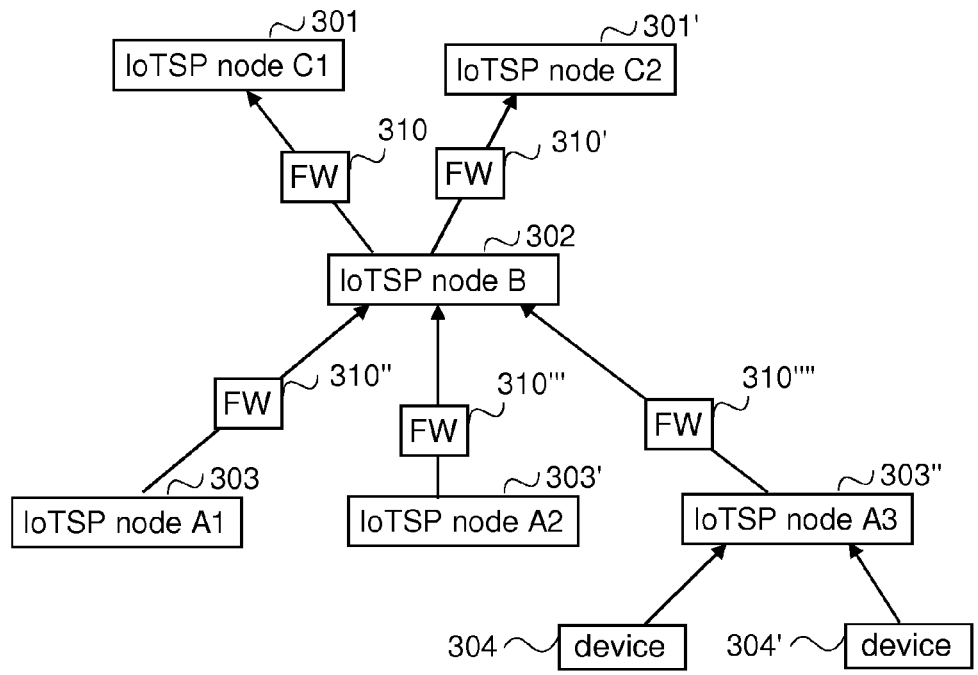
FIG. 3 is a schematic diagram illustrating a part of an IoTSP (Internet of Things, Services and People) system.

FIG. 3 depicts a part of an IoTSP system, only illustrating few gateways (nodes) and devices to describe one exemplary implementation.

Referring to FIG. 3, the IoTSP nodes A1 303, A2 303' and A3 303" depicts gateways in a plant level, the IoTSP node B 302 depicts a gateway in an upper hierarchy level and the IoTSP nodes C1 301 and C2 301' depict gateways in a further upper hierarchy level. Connections between the nodes are depicted by arrows. Further, there exist one or more firewalls (FW) 310, 310', 310", 310''', 310'''' between connected gateways (IoTSP nodes) 301, 301', 302, 303, 303', 303" for securing the IoTSP system.

In the illustrated example, the firewalls are configured not to allow connections to southbound nodes, as depicted by directions indicated by arrow ends of the connections in FIG. 3. This results to a situation in which a connection from an industrial plant to a cloud is possible, but not from the cloud to a node at the industrial plant. However, all the connections are bidirectional so that when a node is connected to its northbound neighbour, the connection is also established backwards. In such an environment the connected nodes information contains only the northbound nodes whereto the connection is or can be established. Further, the publishing rules may be bidirectional and contain a definition to which direction the data is transferred, i.e. from the publisher (southbound node) to the receiver (northbound node) or to the other direction.

For example, the receiving rules in the IoTSP node A3 303" apply to data sent from devices 304, 304', i.e. devices that are publishing/sending data to the IoTSP node A3. Correspondingly, using the IoTSP node B 302 as an example, the receiving rules in the IoTSP node B apply to southbound IoTSP nodes A1, A2 and A3 that are connected to the IoTSP node B and publishing their data to the northbound IoTSP node B. Further, the receiving rules in the IoTSP nodes C1 and C2 apply to southbound IoTSP node B publishing data to the northbound IoTSP nodes C1 and C2.

Respectively, the publishing rules in the IoTSP nodes A1, A2 and A3 apply to data sent to the IoTSP node B from the IoTSP nodes A1, A2 and A3, correspondingly, and the data publishing rules in the IoTSP node B apply to data sent from the IoTSP node B to the IoTSP nodes C1 and C2.

Examples of what a rule for a system depicted in FIG. 3 may comprise, i.e. rule properties, are described below with tables 1 and 2. Further, the tables comprise for each rule property a short description clarifying a purpose of the rule property. In addition, at least one implementation example is given.

Table 1 illustrates rule properties for data publishing rules:

| Rule property | Description | Example of sending a set of variables | Example of sending all my pump instances | Example of sending events | Example of a write back property |
|---|---|---|---|---|---|
| In/Out | Whether to the data is to send (out) or | Out | Out | Out | In |

-continued

| Rule property | Description | Example of sending a set of variables | Example of sending all my pump instances | Example of sending events | Example of a write back property |
|---|---|---|---|---|---|
| SourceConnection | the receiver to write it back (in) Connection to remote data source (if the source is not the local node) | | | | |
| SourceClass (Data-SourceClass) | Equipment model | Variable | MyPump | OPCEvent | ABB.IA.Service-Port.Control Loop |
| SourceProperty Filter | Selection for a source property | Current Value | * | * | FCE-SizeHigh-Limit |
| Publish Equipment Type | Published Equipment Model | SysInfo | | | |
| PublishProperty | Name of the published property | (Name: 4-2) | (Property Name} | | |
| Publish DataType | Data type, if the type of the published property is different than the type of the source | | | | |
| PublishPath | Published instance hierarchy | SysInfo | | | |
| Root | Where to search the defined instances | | | | My-Plant.Control Structure |
| InstanceFilter | For selecting the source instances | Name like 'SYS_*' | Name like 'Company.My-Plant.*' | Category like 'Security' | |
| History ValueFilter | Aggregation filter for the value | AVG1MIN | | | |
| UpdateRate | Sending frequency (default event based) | 00:01:00 | | | |

(* stands for a wildcard)

It should be appreciated that the above are mere examples not limiting different alternatives how to define and/or use rule properties. For example, even though in the table 1, the history value filter and the sending frequency match to each other (a one minute average over a value is sent every minute), that need not to be the case. For example, a sliding monthly sum (the history value filter) may be sent every day.

Table 2 illustrates rule properties for data receiving rules:

| Rule Property | Description | Example of receiving sysInfo |
|---|---|---|
| ReceivedClass (Received DataClass) | Equipment model | SysInfo |
| ReceivedPropertyFilter | Selection for source property | |
| LocalEquipmentType | Local Equipment Model for storing | |
| LocalProperty | Name of the local equipment property where to store the value | |
| LocalDataType | Data type, if the type of the published property is different than the local type | |
| DefaultPath | Default path in the local database | New.SysInfo |
| InstanceFilter | For selecting the instances | |

The received class indicates the equipment model, which is transferred and then if conversion is needed, the local equipment type and/or with the local data type define one or more conversion rules.

Referring to the example in FIG. 3, a data transfer service (provided by the data publishing unit) resides in the southbound node and a data receive service (provided by the data receiving unit) in the northbound node. However, if the publishing rules define that data to be published is of type "in" meaning that the transfer direction is actually from the data receive service (northbound node) to the data transfer service (southbound node), the data receive service, i.e. the data receiving unit, is configured to send the data backwards to the data transfer service, i.e. the data publishing unit in the southbound node, wherein the data publishing unit is configured to store the data of type "in" to its local database.

Device interfaces may be configured to behave similarly like the data publishing unit and/or the data receiving unit. In other words, a device connects to its neighbour IoTSP Gateway and publishes the data relevant to its equipment model and the neighbour IoTSP Gateway checks its receiving rules to find out whether it accepts the data from the device. The neighbour IoTSP Gateway may further check should the data be converted and if yes, how, before storing the data in its database.

Basic functionality of the data flow unit, or more precisely its sub-units the data publishing unit and the data receiving unit, is described below with FIGS. 4 to 7. It should be appreciated that normal analysis, data collection, data storing, data sending, and receiving may take place as a continuous background process in every gateway. In upper level gateways, most of information may be received from southbound connected gateways (computing devices) but even in such a case normal analysis may take place as a background process. However, such processing and analysis, even though important for end users, is not illustrated herein.

Figure 4:
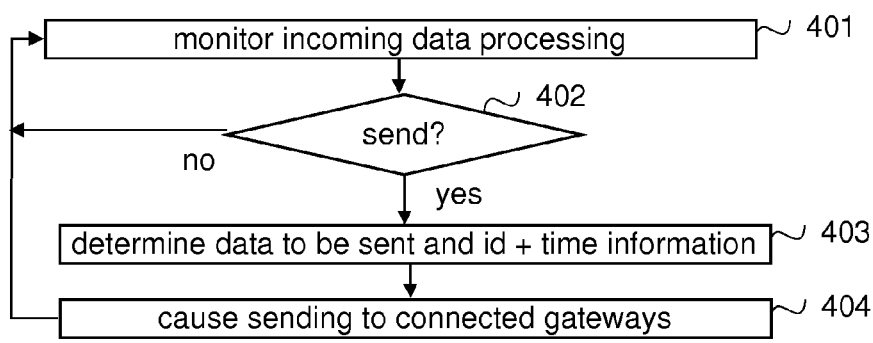
FIGS. 4 and 5 are flow charts illustrating exemplary functionalities

FIG. 4 illustrates the functionality of the data publishing unit (i.e. the data flow unit in regard to sending data), according to current data flow rules for sending. In the example illustrated in FIG. 4 it is assumed that data processing includes inserting raw data, i.e. data received, to a data storage, reading property definitions of equipment models whose instances are running, and performing required functions including alarm limit checking, triggering of alarms if needed, calculating defined aggregates, storing them etc. Examples of properties on which data is collected include identification data, such as serial numbers, hardware types, software version numbers, continuous time series on device properties, such as a rotation speed, product grade, current location, and on properties on the device's environment, such as temperature, humidity, periodical samples on some data or properties, such as vibration; aggregates calculated on data, alarms and events (classified data in a form of property-value pairs), just to mention few. Typically, for each property a sampling cycle, a collection period, a length of a sampling period, and one or more aggregation functions are defined separately. In addition to that, there are the publishing rules (data flow rules for sending/transferring) that configure the gateway to react to certain data insertions and/or to send certain information whenever there is a new value/an updated value.

Referring to FIG. 4, incoming data and its processing is monitored in step 401 until it is detected that a condition to send, i.e. a sending rule, is met (step 402). For example, a new hourly average value of humidity is inserted.

If a condition to send is met (step 402: yes), then in the illustrated example it is determined in step 403 what data to send, its identification information, and time information associated with the data. For example, the data to send may be a copy of the data inserted, and the time information may indicate previous insertion time and the current insertion time. The identification information may be defined by semantics in the related equipment model that caused the data to be inserted. The sending rule may also comprise some identification information to be used when data items fulfilling the rule are sent. Typically, an insertion of a certain key performance indicator or an aggregated value causes it to be sent with identification information describing the type of the data and the instance. Another example includes calculating a value from a data set. Still another example, assuming that data publishing rules define to send a number of alerts caused by a device when the number exceeds a given value, one may deduce related identification information from corresponding instance semantics, and the time information may indicate time of the first alarm and/or the sending time. Then sending the determined data with the identification information and with the time information (if any) is caused in step 404 to connected gateways (nodes) that are indicated in the connected node information. Typically, the gateways are northbound gateways. Then the process continues monitoring (step 401).

It should be appreciated that the above is an extremely exemplified process. For example, there may be timers that run property-specifically or there may be a common timer to ensure that every now and then the gateway sends at least something. However, the above process highlights that by means of data flow rules one can ensure that each gateway has the data it needs. For example, assuming that the gateway is a device level gateway, following data processing may take place: raw data is measured from a sensor once per second and stored to the memory, a running time average of the raw data is calculate for one minute level so that every second a new value is calculated to a current minute time average and stored to the memory. Every minute the current time average stored to the memory is sent to northbound devices, which in turn may receive minute averages from several lower level gateways, and calculate a further average using them. Basically, whenever a new value is recorded from the sensor, aggregates are collected online, and cumulated to upper levels.

Figure 5:
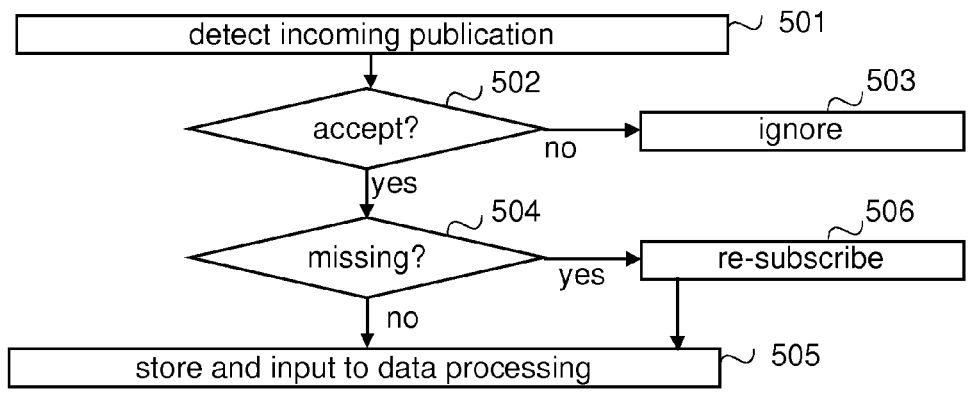

The process described with FIG. 4 may be implemented to gateways in any level and yet it provides event based close to real-time data transfer. FIG. 5 illustrates functionality of the data flow unit, or its sub-unit, the data receiving unit, regarding incoming data. A piece of incoming data is called herein a publication.

Referring to FIG. 5, when an incoming publication is detected in point 501, it is checked, using the receiving rules and identification information in the publication, in step 502, whether or not to accept the incoming publication. For example, if the incoming data (publication) indicates that it is temperature information but the gateway is for monitoring processing time, the incoming data will be declined (not accepted). Another example is that if the incoming data indicates that it is data on a specific instance, such as an instance having a name fulfilling a criteria *.ACS880.*, where * indicates wildcards, it is accepted. If the receiving rules indicates (step 502: no) that the publication is not to be accepted (declined/filtered), the publication is simply ignored (step 503)/discarded. If the publication is to be accepted (step 502: yes), in the illustrated example it is checked in step 504, whether or not one or more previous publications are missing. That may be determined using a key in the publication. The key means herein information that individualizes the publication, i.e. defines it uniquely enough. The key is a kind of an index, individual code or data structure. An example of a key is time information, such as a time stamp, in the publication. Another example of the key includes a combination of the time information and a property identifier, like local equipment property identifier, or equipment model identifier. Still a further example includes an indication of the last sent data item and currently sent data item, an indication being for example a running number and instance identifier/device identifier, or the identification information in the publication. With the key, or any corresponding information, it is possible to detect whether some pieces of data, i.e. one or more publications, are missing. If one or more publications are not missing (step 504: no), the received publication is stored in step 505, as if it were a raw data, to a data storage of the gateway. In addition to that, the publication is inputted in step 505 to the incoming data processing.

If it is detected that one or more publications are missing (step 504: yes), publications are re-subscribed (ordered) in step 506, by sending the key of the last stored publication or sending the last stored data item, for example, to the publisher. Naturally, also information on the publication detected in step 501 may be sent. However, typically a publishing entity (publisher) is aware of the last publication, and upon receiving the re-subscription is able to determine what publications are missing, and sending only them. After re-subscribing, or simultaneously with the re-subscribing, the process proceeds to step 505 to store the received publication.

It should be appreciated that if more than one publication was missing, and re-subscribed publications are received according to an order indicated by the keys, no missing publications are detected. However, if a re-subscribed received publication is not the subsequent application of the previous one, based on corresponding keys, a missing publication (or missing publications) are detected and re-subscribed.

It should be appreciated that in another example steps 504 and 506 are omitted, i.e. no checking whether a publication is missing is performed: a received publication is either ignored or stored.

Figure 6:
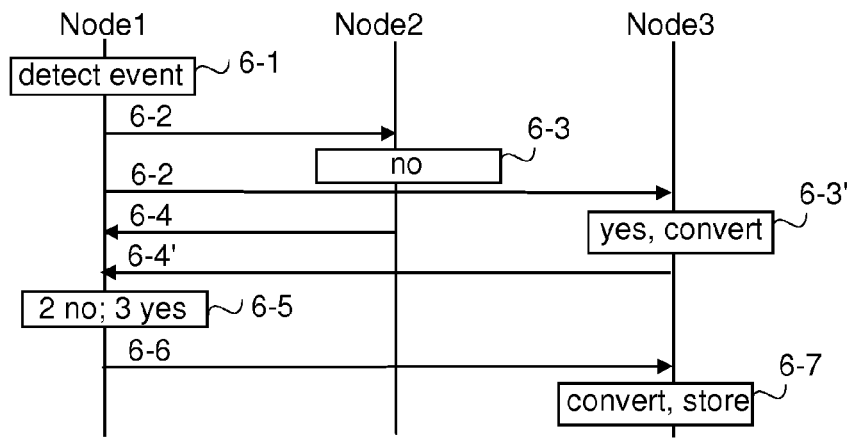
FIG. 6 illustrates an exemplary information exchange.

FIG. 6 illustrates exemplary information exchange in an IoTSP system described with FIG. 3, or in any other corresponding system. For example, Node 1 may be the IoTSP node B, Node 2 the IoTSP node C1 and Node 3 the IoTSP node C2 for data whose data transfer rules indicate that the data type is "Out".

Referring to FIG. 6, the Node 1, or more precisely a data transfer service provided by the data publishing unit in the Node 1, interprets all publishing rules of the Node 1, and upon detecting in point 6-1 one or more events fulfilling one or more publishing rules, the Node 1 connects, as indicated by messages 6-2, to its northbound neighbourg nodes Node 2 and Node 3, and presents (information in messages 6-2) to the Node 2 and the Node 3 what data is available from the Node 1.

The Node 2 and the Node 3, or more precisely a data receive service in each of the Node 2 and the Node 3, provided by the data receiving unit in the corresponding Node, checks in point 6-3, 6-3', using receiving rules of the Node, whether or not the Node accepts the data. In the illustrated example, it is assumed that the receiving rules in the Node 2 cause the Node not to accept data (point 6-3) and the receiving rules in the Node 3 cause the Node to accept and convert the data (point 6-3'). The Node 2 and the Node 3, or the data receive service in the corresponding Node, both respond (messages 6-4, 6-4') back to the Node 1 (or the data transfer service in the Node 1) for each data indicated in message 6-2 whether the data is accepted or not. In the illustrated example, the Node 1 detects in point 6-4 that the Node 2 did not accept the data, whereas the Node 3 accepts the data. Therefore the Node 1 (its data transfer service), starts sending the data (one or more messages 6-6, only one illustrated) to the Node 3 (its data receiving service). The Node 3 (its data receive service) starts receiving the accepted data, and in the illustrated example converts in point 6-7 the data according to the conversion rules in the receiving rules and then stores in point 6-7 the data to its local database.

By requesting acceptance from all connected northbound gateways (nodes) it is ensured that data reaches all destinations wanting/needing the data but the network is not loaded in vain by sending data just to be filtered away/ignored by the receiving end.

In another example, the event causing the sending (point 6-1) is associated with information indicating whether or not to beforehand request an indication of acceptance (in message 6-2) from a receiving gateway (node), and if not the sending gateways connects and sends the data to all northbound connected devices (using the example of FIG. 6, message 6-6 would be sent also to the Node 2 which then would not accept the data). This may even decrease the load in the network: use of only messages 6-6 to data with a small size (i.e. no messages 6-2 and 6-4, 6-4') and the information exchange illustrated in FIG. 6 to data whose transmission causes more load to the network than the one caused by requesting an indication of acceptance.

Figure 7:
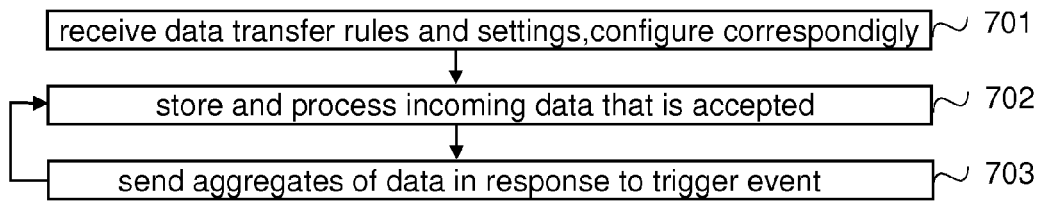
FIG. 7 is a flow chart illustrating an exemplary functionality.

It should be appreciated that, as said earlier, both the Node 1 and the Node 3, or only the Node 1 may convert the data, or no data conversion takes place. FIG. 7 illustrates a general functionality of a gateway. When data flow rules and settings are received in step 701, the gateway node configures in step 701 itself correspondingly. In other words, the gateway node is provided with the data flow rules in step 701.

Once configured, the gateway continuously stores and processes in step 702 all incoming data that is accepted according to one or more of the data flow rules, and sends in step 703, according to one or more of the data flow rules, indicated aggregates of received data in response to a trigger event causing sending the data. As is evident from the above, the trigger event and/or the indicated aggregates of the data is/are determined by one or more of the data flow rules (or more precisely, the data publishing rules).

As said above, it may be that a gateway receives all data, i.e. everything is accepted, and/or aggregation is not performed, i.e. the gateway sends all data it receives, and possibly also analysis results on the received data.

The above described processes in FIGS. 3 to 7 may be summoned up as follows: each gateway contains information on its neighboring gateways, each gateway has definitions on data that it sends to northbound and/or to southbound gateways and that it receives/declines to receive from other gateways. From the information flow perspective the majority of the real-time data and details may be next to the origin of the data, but there is a freedom to aggregate and refine data in any gateway while the data is transferred to upper levels in an IoTSP network and the systemic view may be changing from the sensor and device to system unit, production line, plant, enterprise, and fleets of devices and systems. Further, the data flow unit (the publishing unit) is easily configurable to transfer various kinds of data with different time series, for example, based on different information models. That in turn makes data flows rules relatively simple, thereby ensuring fast processing the data flow rules, and timely sending of information.

The steps, points, messages (i.e. information exchange) and related functions described above in FIGS. 2 to 7 are in no absolute chronological order, and some of the steps may be performed simultaneously or in an order differing from the given one. Other functions can also be executed between the steps or within the steps, and other information may be sent. Some of the steps or part of the steps can also be left out or replaced by a corresponding step or part of the step.

The techniques described herein may be implemented by various means so that an apparatus implementing one or more functions described with an embodiment, or a combination of embodiments, comprises not only prior art means, but also specific means for implementing the one or more functions described with an embodiment and it may comprise separate means for each separate function, or specific means may be configured to perform two or more functions. The specific means may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 8:
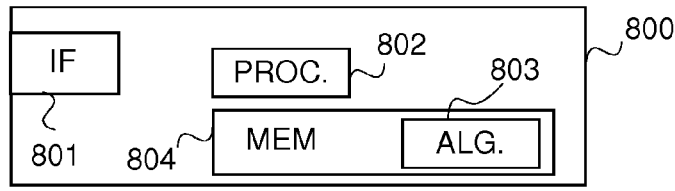
FIG. 8 is a schematic block diagram.

FIG. 8 is a simplified block diagram illustrating some units for a device (an apparatus) 800 configured to be an gateway for IoTSP, or a corresponding computing device, comprising at least the data flow unit, or its sub-unit(s), i.e. the data publishing unit and/or the data receiving unit, described above with FIGS. 1 to 7 or corresponding functionality or some of the corresponding functionality if functionalities are distributed in the future. In the illustrated example, the device comprises one or more interfaces (IF) 801 for receiving and/or retrieving and/or transmitting information from or to other devices, and possibly from or to a user, a processor 802 configured to implement at least the data flow unit, described herein, or at least part of corresponding functionality as a sub-unit functionality if distributed scenario is implemented, with corresponding algorithms 803, and memory 804 usable for storing a computer program code required for the data flow unit, or a corresponding unit or sub-units, i.e. the algorithms for implementing the functionality. The memory 804 is also usable for storing other possible information, like the lists, data flow rules, equipment models, raw data, etc.

In other words, a device (apparatus) configured to provide the gateway for IoTSP, or a device/apparatus configured to provide one or more corresponding functionalities described above with FIGS. 1 to 7, is a computing device that may be any apparatus or device or equipment or node configured to perform one or more of corresponding device functionalities described with an embodiment/example/implementation, and it may be configured to perform functionalities from different embodiments/examples/implementations. The data flow unit, as well as corresponding units and sub-units may be separate units, even located in another physical apparatus, the distributed physical apparatuses forming one logical apparatus/device providing the functionality, or integrated to another unit in the same apparatus/device.

The device/apparatus configured to provide the gateway for IoTSP, or a device configured to provide one or more corresponding functionalities may generally include a processor, controller, control unit, micro-controller, or the like connected to a memory and to various interfaces of the apparatus. Generally, the processor is a central processing unit, but the processor may be an additional operation processor. Each or some or one of the units/sub-units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/sub-units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), logic gates and/or other hardware components that have been programmed and/or will be programmed by downloading computer program code (one or more algorithms) in such a way to carry out one or more functions of one or more embodiments/implementations/examples. An embodiment provides a computer program embodied on any client-readable distribution/data storage medium or memory unit(s) or article(s) of manufacture, comprising program instructions executable by one or more processors/computers, which instructions, when loaded into a device, constitute the data flow unit, or its sub-unit(s). Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Further, the device/apparatus configured to provide the gateway for IoSTP, or a device configured to provide one or more corresponding functionalities described above with FIGS. 1 to 7 may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. In other words, the memory, or part of it, may be any computer-usable non-transitory medium within the processor/apparatus or external to the processor/apparatus, in which case it can be communicatively coupled to the processor/apparatus via various means as is known in the art. Examples of an external memory include a removable memory detachably connected to the apparatus, a distributed database and a cloud server. The memory may also store computer program code such as software applications (for example, for one or more of the units/sub-units/algorithms) or operating systems, information, data, content, or the like for the processor to perform steps associated with operation of the apparatus in accordance with examples/embodiments.

It will be obvious to a person skilled in the art that, as technology advances, the inventive concept can be implemented in various ways. The invention and its embodiments are not limited to the examples described above but may vary within the scope of the claims.

The invention claimed is:

1. A computerized method comprising:
providing a computing device acting as a gateway in a system comprising plurality of Industrial Internet of Things with data flow rules to control data flows from a plurality of connected nodes to the computing device and data flows from the computing device to one or more computing devices acting as gateways in the system, one or more of the data flow rules being a receiving rule defining at least what incoming data will be accepted and one or more of the data flow rules being a publishing rule defining at least what data to send to the one or more computing devices acting as gateways in the system;
detecting, by the computing device, incoming data flow over one of the plurality of connections between the computing device and the plurality of the connected nodes;
applying, by the computing device, the one or more receiving rules to the incoming data flow comprising incoming data to determine whether to accept to receive the incoming data or to decline to receive the incoming data;
receiving, over the one of the plurality of connections, in response to the incoming data being accepted to be received, the incoming data;
storing and processing, in response to the incoming data being received, the incoming data, the storing and processing including at least inserting the incoming data as a raw data to a data storage and inserting processed data to the data storage;
applying, by the computing device, one or more publishing rules to stored and processed data by monitoring whether received incoming data in the data flows over the plurality of connections and its processing fulfil at least one of the one or more publishing rules; and
in response to the detecting, by the computing device, during the monitoring, that a condition in a publishing rule amongst the one or more publishing rules is fulfilled, causing sending, according to what is defined in the publishing rule, one or more pieces of the data in the data storage from the computing device to at least one of the one or more computing devices acting as gateways in the system in at least one data flow.

2. The method of claim 1, further comprising:
maintaining in the publishing rules at least an indication whether to send the data to a direction towards a central cloud level or to a direction towards a device level; and
causing sending the one or more pieces of the data from the computing device to connected gateways in the indicated direction.

3. The method of claim 1, further comprising:
causing, in response to the condition in the publishing rule being fulfilled, requesting an indication of an acceptance of the one or more pieces of the data before causing the sending; and
causing the sending if an indication of an acceptance is received.

4. The method of claim 1, further comprising:
receiving, by the computing device, an indication of data to be published;
determining, by using the one or more data receiving rules and the indication, whether or not to accept the data; and
causing sending result of the determining in a response.

5. The method of claim 1, wherein the data receiving rules comprises one or more converting rules the method further comprising:
converting, by the computing device, data according to the converting rules before inserting the data to the data storage.

6. The method of claim 1, wherein the data publishing rules comprises one or more converting rules, the method further comprising:
converting, by the computing device, the one or more pieces of data according to the converting rules before causing sending the one or more pieces of data.

7. The method of claim 1, wherein each of the pieces of data send and received are associated with a key, the method further comprising:
using, by the computing device, the key in a received piece of data and a key from a previously received piece of the data from the same sender to determine whether or not some pieces of data has not been received; and
causing requesting missing pieces of data, if it is determined that some pieces of data has not been received.

8. The method of claim 7, wherein the key comprises at least time information.

9. The method of claim 1, further comprising:
providing the computing device with one or more information models; and
using by the computing device one or more properties in a corresponding information model when the data flow rules are applied.

10. The method of claim 1, wherein
the data publishing rules define further one or more of a data source class, name of published property, instance hierarchy, and an instance filter for selecting source instances, data type; and
the data receiving rules define further one or more of a source property, received data class, where to store the pieces of the data, and a default path in a local database.

11. A non-transitory computer readable storage medium comprising program instructions which, when executed by a computing device acting as a gateway in a system comprising plurality of Industrial Internet of Things, cause the computing device to perform at least the following:

providing the computing device with data flow rules to control data flows from a plurality of connected nodes to the computing device and data flows from the computing device to one or more computing devices acting as gateways in the system, one or more of the data flow rules being a receiving rule defining at least what incoming data will be accepted and one or more of the data flow rules being a publishing rule defining at least what data to send to the one or more computing devices acting as gateways in the system;

applying, by the computing device, in response to detecting, by the computing device, incoming data flow over one of the plurality of connections between the computing device and the plurality of the connected nodes, the one or more receiving rules to the incoming data flow comprising incoming data to determine whether to accept to receive the incoming data or to decline to receive the incoming data;

receiving, over the one of the plurality of connections, in response to the incoming data being accepted to be received, the incoming data;

storing and processing, in response to the incoming data being received, the incoming data, the storing and processing including at least inserting the incoming data as a raw data to a data storage and inserting processed data to the data storage;

applying, by the computing device, one or more publishing rules to stored and processed data by monitoring whether received incoming data in the data flows over the plurality of connections and its processing fulfil at least one of the one or more publishing rules; and in response to the detecting, by the computing device, during the monitoring, that a condition in a publishing rule amongst the one or more publishing rules is fulfilled, causing sending, according to what is defined in the publishing rule, one or more pieces of the data in the data storage from the computing device to at least one of the one or more computing devices acting as gateways in the system in at least one data flow.

12. The non-transitory computer readable storage medium of claim 11, further comprising program instructions which, when executed by the computing device cause the computing device to perform:

maintaining in the publishing rules at least an indication whether to send the data to a direction towards a central cloud level or to a direction towards a device level; and causing sending the one or more pieces of the data from the computing device to connected gateways in the indicated direction.

13. An apparatus comprising at least one processor, and one memory including computer program code, wherein the at least one memory and the computer program code are configured to, with the at least one processor, cause the apparatus to perform at least:

acting as a gateway in a system comprising plurality of Industrial Internet of Things;

providing the apparatus acting as the gateway with data flow rules to control data flows from a plurality of connected nodes to a computing device and data flows from the computing device to one or more computing devices acting as gateways in the system, one or more of the data flow rules being a receiving rule defining at least what incoming data will be accepted and one or more of the data flow rules being a published rule defining at least what data to send to one or more apparatuses acting as gateways in the system;

detecting, by the computing device, incoming data flow over one of the plurality of connections between the computing device and the plurality of the connected nodes;

applying the one or more receiving rules to the incoming data flow comprising incoming data to determine whether to accept to receive the incoming data or to decline to receive the incoming data;

receiving, over the one of the plurality of connections, in response to the incoming data being accepted to be received, the incoming data;

storing and processing, in response to the incoming data being received, the incoming data, the storing and processing including at least inserting the incoming data as a raw data to a data storage and inserting processed data to the data storage;

applying one or more publishing rules to stored and processed data by monitoring whether received incoming data in the data flows over the plurality of connections and its processing fulfil at least one of the one or more publishing rules; and in response to the detecting, during the monitoring, that a condition in a publishing rule amongst the one or more publishing rules is fulfilled, causing sending, according to what is defined in the publishing rule, one or more pieces of the data in the data storage from the computing device to at least one of the one or more computing devices acting as gateways in the system in at least one data flow.

14. The apparatus of claim 13, wherein the apparatus is an edge computing node in an Industrial Internet of Things.

15. The apparatus of claim 13, wherein the apparatus configured to receive the pieces of data from one or more apparatuses in a hierarchy level towards a device level and to publish the pieces of data to one or more apparatuses in a hierarchy level towards a central cloud level.

16. The apparatus of claim 13, wherein the at least one memory and the computer program code are configured to, with the at least one processor, cause the apparatus to perform at least:

maintaining in the publishing rules at least an indication whether to send the data to a direction towards a central cloud level or to a direction towards a device level;

causing sending the one or more pieces of the data from the apparatus to connected gateways in the indicated direction.

17. The apparatus of claim 13, wherein the at least one memory and the computer program code are configured to, with the at least one processor, cause the apparatus to perform at least:

causing, in response to the condition in the publishing rule being fulfilled, requesting an indication of an acceptance of the one or more pieces of the data before causing the sending; and causing the sending in response to receiving an indication of an acceptance.

18. The apparatus of claim 13, wherein the at least one memory and the computer program code are configured to, with the at least one processor, cause the apparatus to perform at least:

determining, by using a received indication of data to be published and the one or more data receiving rules, whether or not to accept the data; and causing sending result of the determining in a response.

19. The apparatus of claim 13, wherein the at least one memory and the computer program code are configured to, with the at least one processor, cause the apparatus to perform at least:
- converting, in response to the data receiving rules comprising one or more converting rules for incoming data, the one or more pieces of data according to the one or more converting rules before storing the one or more pieces of data; and
- converting, in response to the data publishing rules comprising one or more converting rules for outgoing data, the one or more pieces of data according to the converting rules before causing sending the one or more pieces of data.

20. The apparatus of claim 13, wherein the at least one memory and the computer program code are configured to, with the at least one processor, cause the apparatus to perform at least:
- using a key in a received piece of data and a key from a previously received piece of the data from the same sender to determine whether or not some pieces of data has not been received; and
- causing requesting missing pieces of data, if it is determined that some pieces of data has not been received.

* * * * *